(12) United States Patent
Lundberg et al.

(10) Patent No.: US 10,195,998 B2
(45) Date of Patent: Feb. 5, 2019

(54) LOFT STORAGE AND EQUIPMENT COMPARTMENT

(71) Applicant: Lund Industries, Inc., Northbrook, IL (US)

(72) Inventors: Mark J. Lundberg, Northbrook, IL (US); Patrick W. Hill, Northbrook, IL (US); Paul A. Lundberg, Northbrook, IL (US)

(73) Assignee: Lund Industries, Inc., Northbrook, IL (US)

( * ) Notice: Subject to any disclaimer, the term of this patent is extended or adjusted under 35 U.S.C. 154(b) by 0 days.

(21) Appl. No.: 15/707,910

(22) Filed: Sep. 18, 2017

(65) Prior Publication Data

US 2018/0079366 A1    Mar. 22, 2018

Related U.S. Application Data

(60) Provisional application No. 62/397,198, filed on Sep. 20, 2016.

(51) Int. Cl.
| | |
|---|---|
| *B60R 5/04* | (2006.01) |
| *B60R 7/14* | (2006.01) |
| *B60R 5/00* | (2006.01) |

(52) U.S. Cl.
CPC .............. *B60R 5/006* (2013.01); *B60R 5/04* (2013.01); *B60R 7/14* (2013.01)

(58) Field of Classification Search
CPC .. B60R 7/08; B60R 5/006; B60R 5/04; B60R 7/14; B60R 2011/0098; B60R 2011/0028; B60R 2011/0096
USPC .............................................. 296/37.16, 37.7
See application file for complete search history.

(56) References Cited

U.S. PATENT DOCUMENTS

| | | | | |
|---|---|---|---|---|
| 3,473,680 A | * | 10/1969 | Downer | B60R 11/06 224/311 |
| 4,717,193 A | * | 1/1988 | Noriega | B60R 7/04 108/149 |
| 5,683,021 A | * | 11/1997 | Setina | B60R 7/14 206/317 |
| 6,572,168 B1 | * | 6/2003 | Radstake | B60R 7/04 224/311 |
| 8,157,313 B2 | * | 4/2012 | Nutt | B60R 11/02 296/37.7 |
| 2007/0247861 A1 | * | 10/2007 | Tiesler | B60R 11/00 362/488 |
| 2016/0281939 A1 | * | 9/2016 | Luk | F21S 8/026 |

OTHER PUBLICATIONS https://www.nadaguides.com/Cars/2015/Ford/Explorer-V6/Utility-4D-Police-AWD/Specs, 2015 Ford Utility Police Interceptor Spec & Performance (Year: 2015).*

* cited by examiner

*Primary Examiner* — Dennis H Pedder
(74) *Attorney, Agent, or Firm* — Tolpin & Partners, PC; Thomas W. Tolpin

(57) ABSTRACT

A compact safe storage compartment for weapons and electronic equipment, also sometime referred to as LOFT, for police sports utility vehicles (SUVs) is provided which is easy to use and access by police and is not readily viewable from outside the SUV by pedestrians, criminals and others. The LOFT can occupy otherwise unused space in the SUV. The LOFT can comprise: a special frame, a unique door for carrying weapons, and/or an optional tray secured to the door for carrying electronic law enforcement equipment.

16 Claims, 5 Drawing Sheets

LOFT STORAGE AND EQUIPMENT COMPARTMENT

BACKGROUND OF THE INVENTION

This invention relates to storage of weapons and equipment for law enforcement, and more particularly, to storage of weapons and electronic equipment in police sports utility vehicles (SUVs).

In law enforcement, there has been a significant move from traditional sedans, the primary one being the Ford Crown Victoria sedan, to SUVs for patrol, emergency response and general emergency vehicle operations and applications. The standard SUV does not have a trunk as sedans do, In police SUVs, many new needs and problems have arisen:
1. Securing items such as shotguns, rifles and less-lethal weapons in the back of the SUV.
2. Keeping weapons out of view or hidden from public view.
3. The visibility issue of weapons is a serious problem especially with campus police, large cities and states where the SUVs of police or county sheriffs are sometimes parked overnight in driveways at homes, on the street, parking lots, etc.
4. Allowing access to the other police equipment such as first aid kits and fire extinguishers, while keeping the weapons secure and out of sight.
5. Providing quick access to officers in emergency or time of need without the need to move other gear and equipment out of the way.
6. The need for a protected area to position and install electronics such as video systems, radios and sirens. These devices generally have complicated wiring and/or multiple wire harnesses. Accidently cutting, breaking or disconnecting a wire can cause the electronic equipment to malfunction. Forcing items such as a stolen bike into the rear of an SUV can knock exposed or unprotected wires loose causing a service call or disabling police equipment.

Also, the equipment generally carried in the police vehicles has changed in recent years. It is common for police patrol vehicles to have high powered "patrol rifles" in addition to standard police "riot shotguns". These patrol rifles are often valued above USD $2000 with the optics, lights, rifle and other accessories they are commonly outfitted with. Riot shotguns were commonly available for a couple of hundred dollars and thus posed much less of an incentive and enticement to steal them from police vehicles. Adding secondary locks and keeping the rifles out of sight reduces the potential theft situation.

While the rear section of the police SUVs is reasonably large, there is a continuing need for more equipment requiring more usable space. The limited space is compounded by some companies, such as Ford, requiring the spare tire remain in place as part of their dynamic crash performance. Additionally, the rear of passenger seat partitions and often hatch and side quarter window bars are used to protect the items behind the second seat from theft or officer injury in the event of a crash. The window and rear seat partitions often reduce visibility to the rear of the police vehicle.

Over the years various types of storage units have been made and suggested to store electronic equipment and rifles and other weapons in law enforcement vehicles, which cannot be readily seen by the public but yet are easily accessible for police and other law enforcement officials. The prior conventional storage units and facilities have met with varying degrees of success.

It is, therefore, desirable to provide an improved storage compartment for weapons and electronic equipment for police SUVs, which overcomes most, if not all of the preceding problems.

BRIEF SUMMARY OF THE INVENTION

An improved storage compartment for weapons and electronic equipment, also sometime referred to as LOFT, for police sports utility vehicles (SUVs) is provided which is easy to use, access, store and is not readily viewable from outside the SUV by pedestrians, criminals and others.

Desirably, LOFT installs up and is positioned near or at the headliner of the SUV above the primary line of sight from the driver's seat. LOFT utilizes otherwise unused space in the vehicle at and above the top of the side and rear windows up to the headliner.

LOFT can provide both push button electric gun locks and additional key or electronic lock latches allowing for double locking. This allows police officer to unlock one level of security but keep second level (electric gun lock) in place and active.

LOFT can be configured for installation and to provide security for electronics, such as video system and programmable lights, sirens, radios, and other electronic devices. This provides the law enforcement agency the ability to install sensitive electronics in an out of the way area of the vehicle and restrict access via key or electronic locks to limit and discourage intentional or unintentional tampering and disruption of the electronics.

LOFT is designed to utilize existing vehicle components including rear D-pillar points, unused third row (no third row seats in the police SUVs), seatbelt location points, floor bolt locations and other locations in the rear of the SUV limiting or avoiding the need to cut trim, headliners, frame or roof of the police vehicles.

A LOFT gun vault provides an easily accessible secure gun mount that can hold one or more weapons in such a way that the police department has multiple choices and options as to mounting positions of the weapons, such as direction of muzzle, e.g. driver's side, passengers side, sights up, sights down, and adjustable lock and bracket mounting to allow for variation of aftermarket equipment common on different weapons.

A LOFT electronics cabinet has a removable electronic equipment tray that allows equipment preparation on a work bench then installation of the tray onto the LOFT door for ease of service and transfer from one SUV to another.

The frame of the LOFT can be attached to the rear of a second row partition, but can also be installed with a non-partition kit for police SUVs without the rear partition. The non-partition mounting kits minimize visibility of the front mounts from outside the vehicle.

LOFT can be transferred from one police SUV to another police SUV with the same or a different mounting kit.

Light emitting diode (LED) mounting brackets allow for easy placement and installation of LEDs to illuminate the open LOFT and the weapons and electronic equipment items within it.

The sides of the frame of the LOFT can be set in and spaced from the side windows of the police SUV to allow for installation of side and rear facing emergency lighting with additional downward facing LEDs (like puddle lights) to illuminate the inside of the rear of the police SUV.

In an embodiment, the LOFT provides a storage and equipment compartment for a police sports utility vehicle (SUV), comprising: a frame securely mounted in proximity to a headliner near a ceiling or roof in a rear cargo section of the police SUV; a door comprising a lid pivotally connected to the frame in which the door is movable between a closed generally horizontal position against the frame and an open downwardly inclined position. The LOFT can include a tray secured to the door for law enforcement equipment or electronics. Desirably, when the door and electronics tray (if used) are in a closed position the weapons or equipment are hidden from view through windows of the SUV. Furthermore, in the closed position, the LOFT does not block or interfere with the driver's rearview sight line comprising the driver's line of sight and viewing from the rearview mirror of the SUV.

The LOFT can include: locks for securing the weapons and equipment; dampers for dampening the movement of the door and tray; at least two straps for limiting the downward movement of the door, and key or electronic locks for locking the door, tray, electronic equipment and an additional electric lock for weapons.

A more detailed explanation of the invention is provided in the following detailed descriptions and appended claims taken in conjunction with the accompanying drawings.

DETAILED DESCRIPTION OF THE INVENTION

Figure 1A:
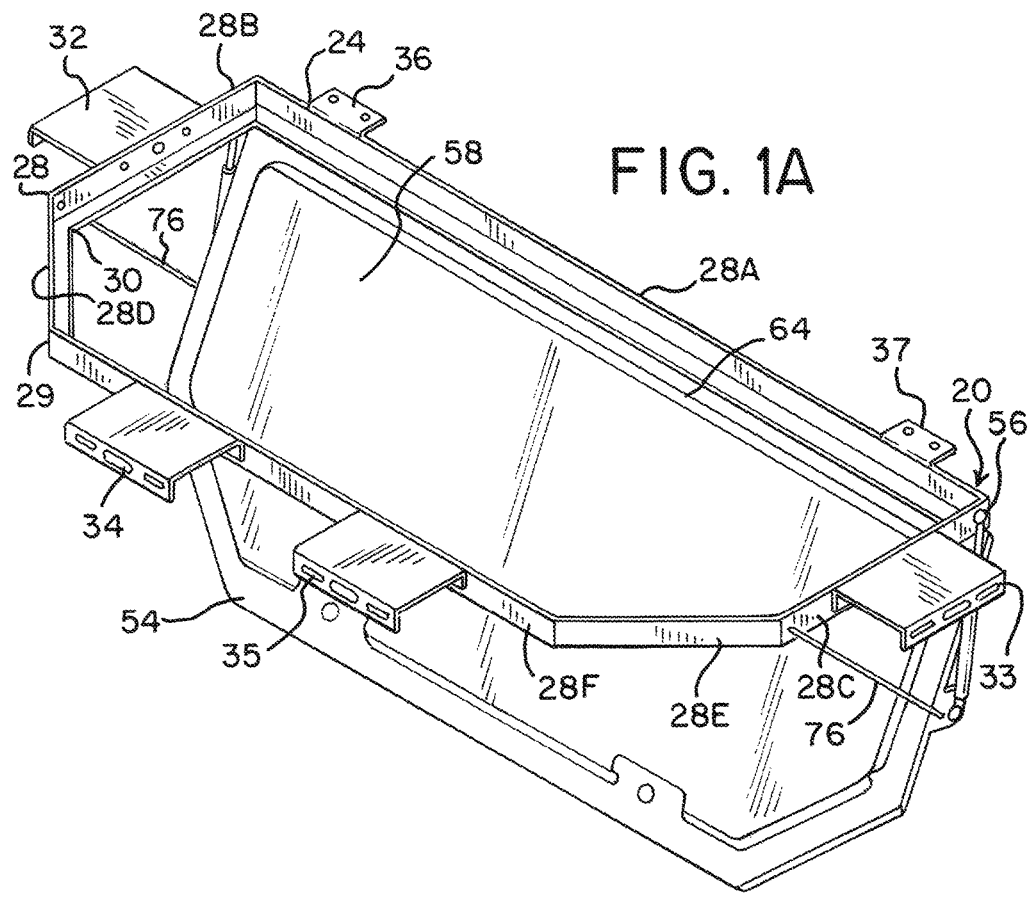
FIG. 1A is an isometric view of a frame assembly of a LOFT storage and equipment compartment in an open position for the upper inside sports utility vehicle (SUV) rear cargo section underneath the headliner in accordance with principles of the present invention.

The following is a detailed description and explanation of the preferred embodiments of the invention and best modes for practicing the invention.

The inventive storage and equipment compartment, sometime simply referred to as LOFT by Lund Industries, Inc., is a multi-purpose storage solution for the Ford Police Interceptor sports utility vehicle (SUV), Ford Explore SUV, Chevy Tahoe SUV and other sport utility vehicles (SUVs). The LOFT fits in the unused space above the window line and up to the headliner in the rear quarter of the SUV. The LOFT-GV is designed for government SUVs weapon storage, such as for AR-15/M-4. rifles equipped with standard collapsible stocks, however LOFT will work with many different weapons and configurations, including dual guns. It can be used with a Ford Explorer utility or Chevrolet Tahoe non-partition mount kit or a LOFT gun vault partition mount for Ford Explorer SUV or Chevrolet Tahoe SUV. The LOFT-EC provides for electronic component installation utilizing a separate removable tray which mounts to the LOFT door.

In both products the storage area used does not take away from space generally used for other gear and equipment in the SUVs of police.

LOFT fits up near the headliner, up and out of the driver's line of sight through the rearview mirror and installs to existing SUV mounting points.

When LOFT is closed and locked, anything inside is very difficult to see, providing additional security for the equipment and/or weapons inside.

When LOFT is opened, its downward motion is smoothly dampened, and prevents unintentional dropping of the equipment or weapons while providing easy access to equipment and weapons.

The LOFT also provides easy installation of side and rear facing emergency light emitting diodes (LEDs). There are also multiple LED work area and cargo area lighting options available.

The LOFT can also have standard trap door gun locks with mounting brackets, universal style gun locks with mounting brackets, butt cup assemblies with mounting brackets, and/or LED mounting brackets.

The LOFT can utilize currently available electric or manually operated heavy duty locks designed to hold and secure guns. These are commercially available from several manufacturers and in a variety of designs and shapes. The LOFT has mounting holes or slots and specific mounting hardware to attach the locks to the LOFT in a variety of locations and positions to allow adjustments to fit various shotguns and rifles.

The individual gun locks that are installed on the LOFT provide the primary security of the weapons for typical on duty operations, while the locks that hold the LOFT door closed are secondary locking systems.

Most Federal Agencies have a three lock policy. Generally, for a federal law enforcement agent to be in compliance with this policy, the agent's weapons must be secured in SUV behind three locks. With the LOFT the security is: (1) the standard locking of the vehicle; (2) the key or electronic locks holding the LOFT door closed; and (3) electric lock(s) on each weapon that are installed onto the LOFT fold down door.

LOFT can open automatically with an electronic push button opener. The two latches holding the fold down door closed can have electronic releasing latches. This will allow the fold down door to be released with the push of a button, unlatching the door of the LOFT and allowing the door to fall to its open position. A secondary, normally hidden, switch can be in rear area of SUV to unlock the actual electric gun locks mounted on the fold down door.

LOFT can also have a switch to unlock the electric locks for the LOFT door and this switch can be located by the installer in the rear of the SUV near the LOFT for easy access by the police officer.

LOFT can store rifles, shotguns, and handguns, as well as other weapons and equipment in the headliner area of the SUVs.

Figure 1B:
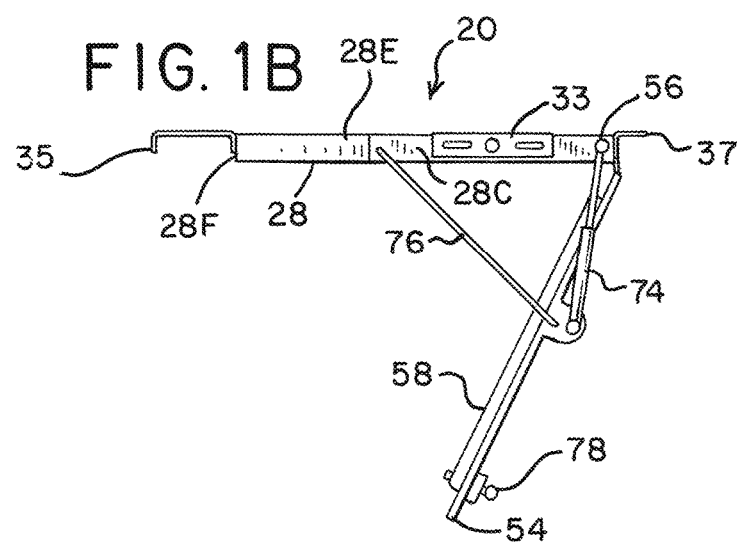
FIG. 1B is an end view of the frame assembly of FIG. 1A in the open position.
Figure 2A:
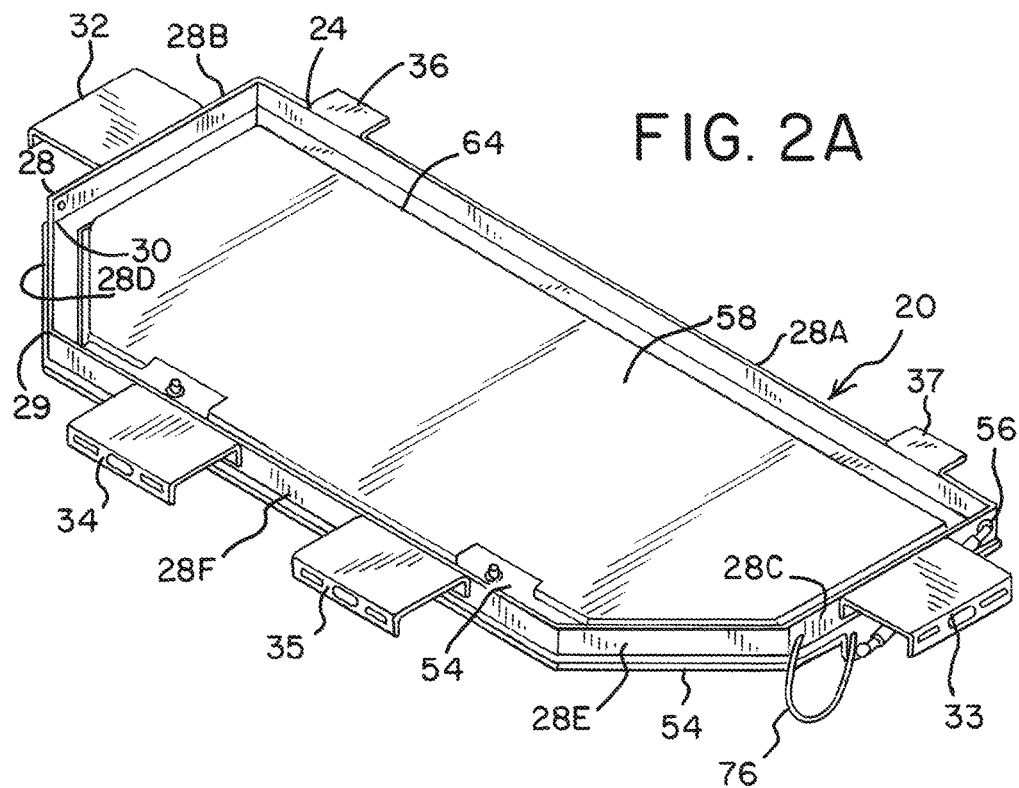
FIG. 2A is an isometric view of the frame assembly of a LOFT storage and equipment compartment in a closed position for the upper inside SUV rear cargo section underneath the headliner in accordance with principles of the present invention.
Figure 2B:
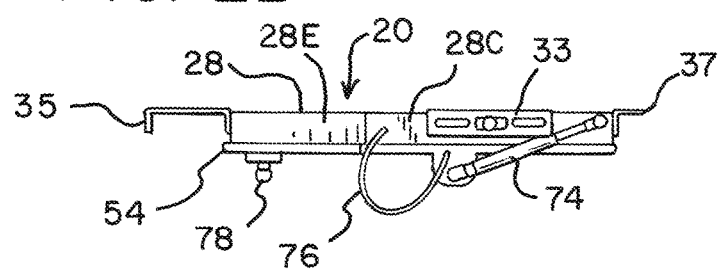
FIG. 2B is an end view of the frame assembly of FIG. 1A in the closed position.
Figure 3:
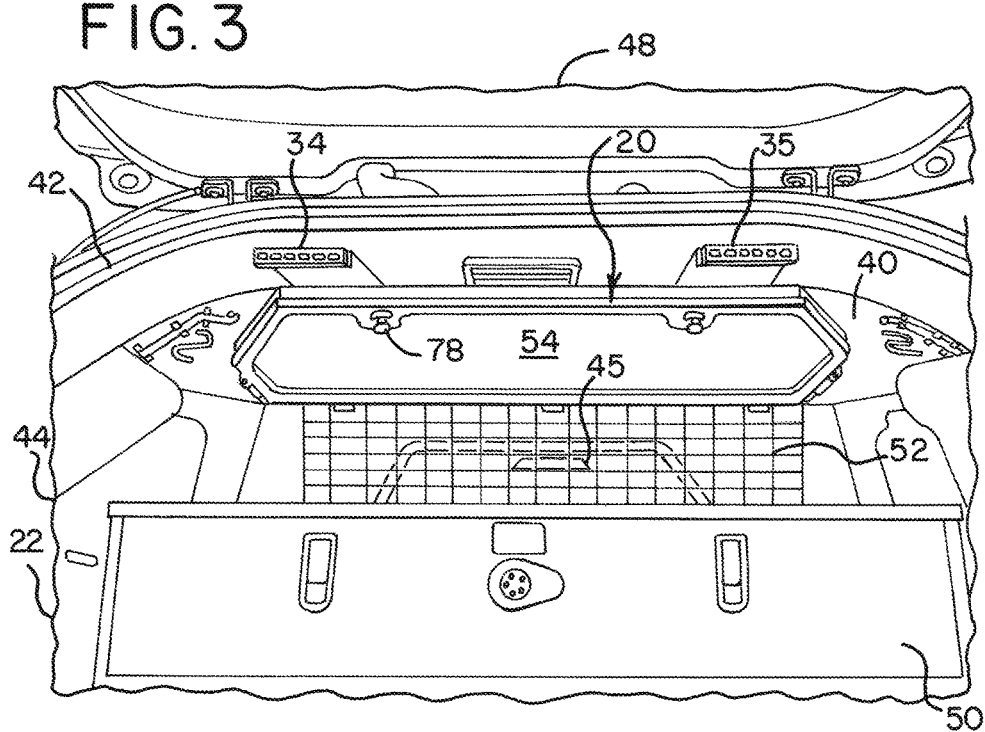
FIG. 3 is a perspective view of a LOFT storage and equipment compartment in a closed position in the back of a SUV in accordance with principles of the present invention.
Figure 4:
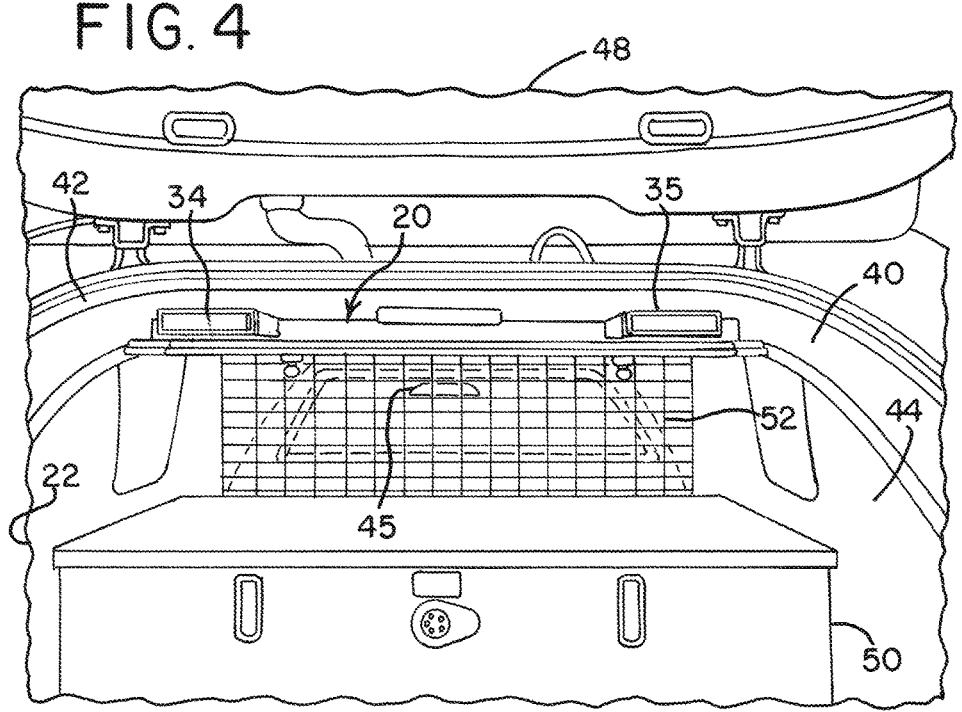
FIG. 4 is a perspective view of another LOFT storage and equipment compartment in a closed position in the back of a SUV in accordance with principles of the present invention.
Figure 5:
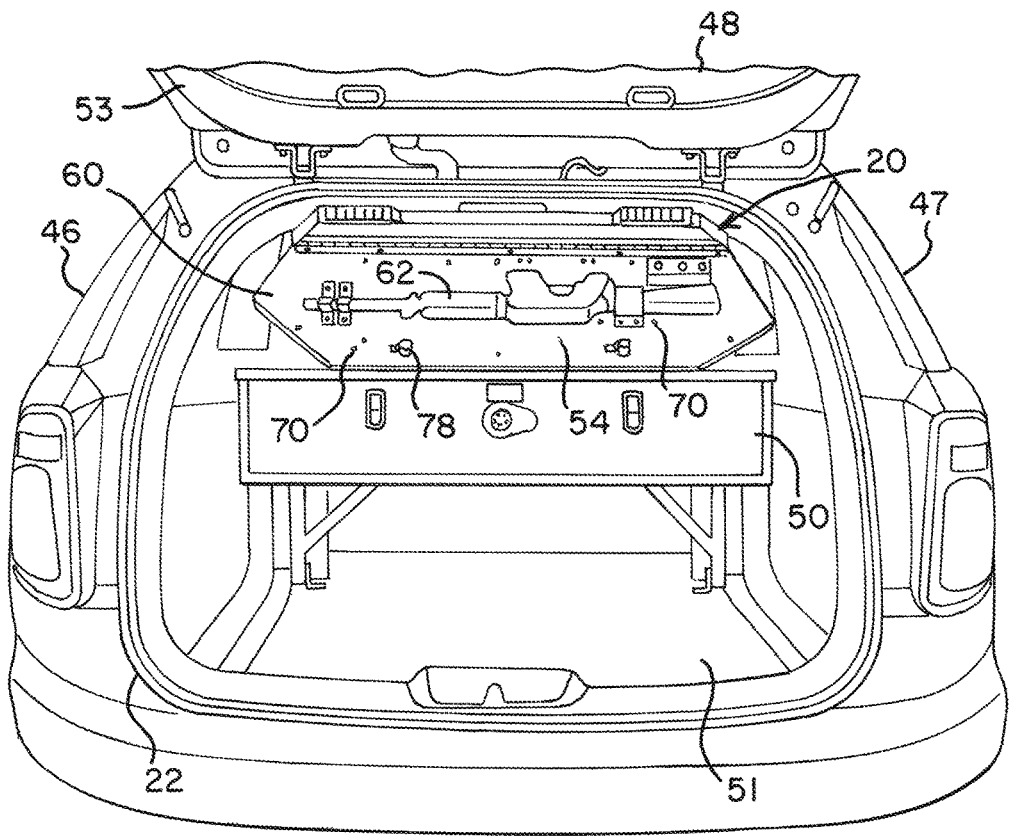
FIG. 5 is a perspective view of a LOFT storage compartment in an open position with a readily accessible rifle in the back of a SUV in accordance with principles of the present invention.

In the illustrated embodiment, LOFT comprises a storage and equipment compartment 20 as shown in FIGS. 1A, 1B, 2A, and 2B for a police sports utility vehicle (SUV) 22 as shown in FIGS. 3-5.

As best shown in FIG. 1A, the LOFT can have a frame assembly 24 comprising a metal structural frame 28, with an upright periphery 29 and an inwardly facing peripheral lip 30 and metal mounting brackets 32-37 connected to the periphery of the frame. The periphery can comprise an elongated front-facing frame section 28A, parallel side-facing frame sections 28B and 28C that extend between and connect the front-facing frame section to slanted, beveled or flared symmetrical corner frame sections 28D and 28E, and a rear-facing frame section 28F that is parallel to and shorter than the front-facing frame section and is connected to the flared corner frame sections.

The mounting brackets can be mounted and secured, such as by fasteners, to securely connect the frame assembly to or adjacent a factory installed roof headliner 40 (FIGS. 3 and 4) near a ceiling 42 or roof in a rear cargo section 44 of the police SUV above a primary line of sight of a rearview minor 45 of the SUV occupying otherwise unused space in the SUV at a location spaced between the side and rear windows 46-48 (FIG. 5) of the SUV. The LOFT can be positioned above an optional cargo storage cabinet 50 providing a trunk vault above a rear hatch cargo floor 51 and rearward of an optional aftermarket wire mesh partition 52 (FIGS. 3 and 4) providing vertical security bars, a grid partition, and/or a safety screen.

As shown in FIG. 1A, the mounting brackets can include side-facing light emitting diode (LED) mounting brackets 32 and 33 facing the sides of the SUV and rear-facing light emitting diode (LED) mounting brackets 34 and 35 facing the rear window and rear hatch door 53 (FIG. 5) of the SUV.

The LOFT can have an elongated substantially rigid metal door 54 (FIGS. 1A and 1B) comprising a generally planar flat aluminum lid having a shape generally complementary to the periphery of the frame. The door provides a tray-supporting surface and is pivotally connected by metal hinges 56 to the frame. Firearms can also be mounted on the door. In use, the door is movable between a closed generally horizontal position abutting against the inwardly facing peripheral lip of the frame as shown in FIGS. 1A and 1B and an open downwardly inclined position positioned at an angle of inclination to the frame as shown in FIGS. 2A and 2B.

Figure 6:
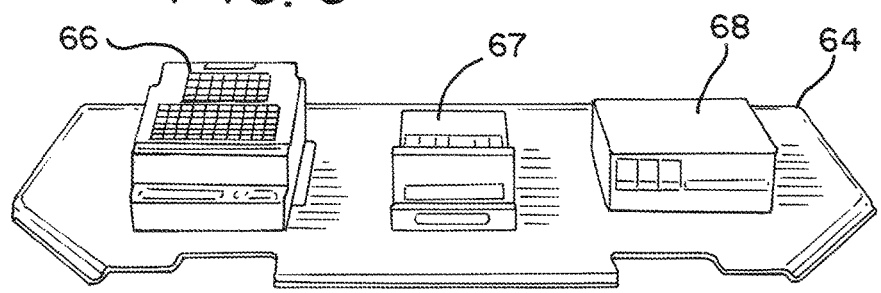
FIG. 6 is a perspective view of an electronics tray support electronic equipment for storage in a LOFT storage and equipment which can be mounted to the LOFT door in the back of a SUV in accordance with principles of the present invention.

The LOFT can have a metal storage tray 58 (FIGS. 1A and 1B), such as an aluminum tray, that is positioned upon, supported and carried by, and secured to the door. The tray can be smaller than the door and surrounded by the outer peripheral edges of the door. As best shown in FIG. 5, the door can comprise a weapon-supporting surface 60 or gun-supporting surface for carrying and supporting weapons 62, such as a rifle, shotgun, and/or handgun. The tray can comprise an electronics equipment tray 64 as best shown in FIG. 6, for carrying law enforcement electronic equipment 66-68, such as siren lights control box 66 with a siren, a strobe light power supply 67 with programmable lights, an on and off switch box 68, video equipment, radio, computer, radar equipment, and/or other electronic devices and equipment. The tray can have an offset and/or raised section to screw or otherwise secure the electronic equipment. Preferably, the tray can be securely locked with the door of the LOFT when there are no weapons carried and supported by the door of the LOFT.

As shown in FIGS. 3 and 4, when the door and tray are in a closed position the weapons and electronic equipment are hidden from view through the side and rear windows of the SUV. Also, in the closed position the door and tray do not block or interfere with the driver's sight line from the rearview mirror of the SUV.

Figure 7:
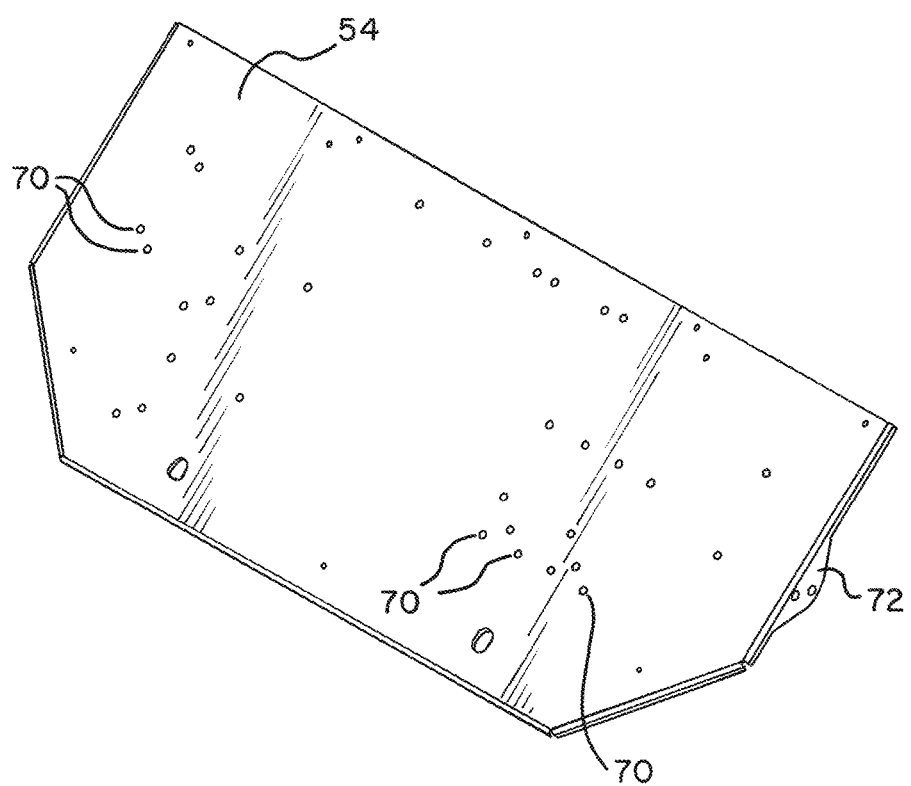
FIG. 7 is a perspective top view of a door with multiple mounting holes for fire arms in a LOFT storage and equipment compartment in accordance with principles of the present invention.

As shown in FIG. 7, the door can also have multiple holes 70, comprising a series, array or pattern of holes, to mount fire arms and weapons. The door can also have damper-supporting brackets connected to the door.

The LOFT, as shown in FIG. 1B, preferably has hydraulic dampers 74 comprising gas spring hydraulic assists that extend between and connect the frame to the damper-supporting brackets of the door for dampening the movement of the door and tray. The LOFT has flexible limiting straps 76 extending between and connecting the frame and door for limiting the downward movement of the door to an open downwardly inclined position at an acute angle of inclination relative to the horizontal frame.

The LOFT can have locks 78 (FIG. 1B) to securely lock and unlock the door of the LOFT. The locks can include manually operable locks comprising quarter turn latches for locking the door and tray. The locks can also include electronic locks that are connected to an electronic switch for remotely locking and unlocking the door, allowing access to weapons and electronic equipment.

As shown in FIGS. 1A and 2A, the frame assembly for the LOFT storage and equipment has a frame assembly with frame sections, hinges, an aluminum lid providing a door, an aluminum equipment tray, gas spring hydraulic assists providing dampers, key locks, optional LED brackets, and nuts.

Among the many advantages of the LOFT are:

1. Superior secure storage of weapons and police equipment.
2. Outstanding performance.
3. Does not obstruct the driver's vision.
4. Better at hiding weapons and police equipment.
5. Compact
6. User friendly.
7. Reliable.
8. Removable Electronics Tray
9. Light weight.
11. Safe.
12. Easy to use
13. Durable
14. Economical.
15. Attractive.
16. Efficient.
17. Effective.

Although embodiments of the invention have been shown and described, it is to be understood that various modifications, substitutions, and rearrangements of parts, components, as well as other uses, shapes, materials, construction, and design of the LOFT storage and equipment compartment, can be used in police SUVs and other law enforcement vehicles, as well as with other weapons and equipment, and can be made by those skilled in the art without departing from the novel spirit and scope of this invention.

What is claimed is:

1. A storage and equipment compartment for a police sports utility vehicle (SUV), comprising:
   a frame securely mounted in proximity to a headliner near a ceiling in a rear cargo section of the police SUV;

a door comprising a lid pivotally connected to the frame, said door having a weapon-supporting surface for carrying and supporting weapons; said door movable between a closed generally horizontal position against said frame and an open downwardly inclined position; and when said door is in a closed position the weapons are hidden from view through rear and side windows of the police SUV and in the closed position said door does not block a line of sight through a rearview mirror of the police SUV;

a rear-facing light emitting diode (LED) mounting bracket facing the rear window of the police SUV.

2. A storage and equipment compartment in accordance with claim 1 including locks for securing the weapons and door.

3. A storage and equipment compartment in accordance with claim 1 including dampers for dampening the movement of said door.

4. A storage and equipment compartment in accordance with claim 1 including two straps extending between and connecting said frame and door for limiting the downward movement of said door.

5. A storage and equipment compartment in accordance with claim 1 wherein said door defines holes for mounting firearms.

6. A storage and equipment compartment in accordance in accordance with claim 1 wherein said police SUV is operable by law enforcement personnel of a city, town, village, county, state, or federal government.

7. A storage and equipment compartment in accordance with claim 6 wherein said law enforcement personnel is selected from the group consisting of a policeman, sheriff, or law enforcement officer.

8. A storage and equipment compartment in accordance with claim 1 including at least two locks for locking and securing said door.

9. A storage and equipment compartment for a police sports utility vehicle (SUV), comprising:

a frame assembly having a frame and mounting brackets connected to said frame for securing said frame assembly adjacent a headliner in proximity to a ceiling or roof in a rear cargo section of the police SUV above a primary line of view of a rearview mirror of the police SUV at a location between side and rear windows of the police SUV;

an elongated door comprising a generally planar lid pivotally connected to the frame, said door being movable between a closed generally horizontal position abutting said frame and an open downwardly inclined position; and a tray secured to said door, said tray comprising an equipment tray for carrying law enforcement electronic equipment; said electronic equipment being selected from the group consisting of video equipment, programmable lights, siren, radio, computer, radar equipment, an electronic device, and combinations thereof; and when said door and tray are in a closed position the electronic equipment is hidden from view through the side and rear windows of the police SUV and in the closed position said door and tray do not block a line of sight through a rearview mirror of the police SUV; and said mounting brackets include light emitting diode (LED) mounting brackets.

10. A storage and equipment compartment in accordance with claim 9 including:

at least two hydraulic dampers extending between and connecting said frame and door for dampening the movement of said door and tray; and at least two straps extending between and connecting said frame and door for limiting the downward movement of said door.

11. A storage and equipment compartment in accordance with claim 9 including manually operable locks comprising quarter turn latches for locking said door and tray.

12. A storage and equipment compartment in accordance with claim 9 including at least two electronic locks for electronically locking and securing said door and electronic equipment.

13. A storage and equipment compartment for a police sports utility vehicle (SUV), comprising:

a frame assembly comprising a metal frame with a periphery and an inwardly facing peripheral lip and metal mounting brackets connected to said periphery of said frame for securing said frame assembly to or adjacent a headliner in proximity to a ceiling in a rear cargo section of the police SUV above a primary line of sight of a rearview mirror of the police SUV occupying otherwise unused space in the police SUV at a location between side and rear windows of the police SUV;

an elongated substantially rigid metal door comprising a generally planar lid having a shape generally complementary to said periphery of said frame, said door comprising a weapon-supporting surface for carrying and supporting weapons and defining holes for mounting the weapons, said door pivotally connected to the frame, and said door being movable between a closed generally horizontal position abutting against said inwardly facing peripheral lip of said frame and an open downwardly inclined position positioned at an angle of inclination to said frame; and said weapons being selected from the group consisting of at least one rifle, shotgun, and handgun, and combinations thereof;

said frame assembly and said door cooperating with each other to provide a gun vault; and when said door is in a closed position the weapons are hidden from view through the side and rear windows of the police SUV and in the closed position said door does not block a line of sight from a rearview mirror of the police SUV; and said mounting brackets include side-facing light emitting diode (LED) mounting brackets facing the side window of the police SUV and rear-facing LED mounting brackets facing the rear window and a rear hatch door of the police SUV.

14. A storage and equipment compartment in accordance with claim 13 including:

damper-supporting brackets connected to said door;

hydraulic dampers extending between and connecting said frame and said damper-support brackets of said door for dampening the movement of said door; and flexible limiting straps extending between and connecting said frame and door for limiting the downward movement of said door to an acute angle of inclination relative to said frame.

15. A storage and equipment compartment in accordance with claim 13 including at least two manually operable locks comprising quarter turn latches for locking said door.

16. A storage and equipment compartment in accordance with claim 15 including at least two electronic locks operably connected to an electronic switch for remotely electronically locking and unlocking said door.

* * * * *